United States Patent [19]
Rochling et al.

[11] 3,904,621
[45] Sept. 9, 1975

[54] NOVEL BENZIMIDAZOLES

[75] Inventors: Hans Rochling, Altenhain, Taunus;
Kurt Hartel, Hofheim, Taunus;
Helmut Goebel, Frankfurt am Main,
all of Germany

[73] Assignee: Hoechst Aktiengesellschaft,
Frankfurt am Main, Germany

[22] Filed: June 19, 1973

[21] Appl. No.: 371,537

[30] Foreign Application Priority Data
June 21, 1972 Germany............................ 2230182

[52] U.S. Cl.... 260/247.2 B; 260/243 B; 260/268 BC;
260/251 R; 260/293.54; 260/293.6;
260/309.2; 424/246; 424/247; 424/269
[51] Int. Cl.²........................................ C07C 295/04
[58] Field of Search...... 260/247.2 B, 309.2, 268 H,
260/268 BC, 243 B, 293.54

[56] References Cited
FOREIGN PATENTS OR APPLICATIONS
1,523,597   5/1968   France

*Primary Examiner*—Robert Gerstl
*Assistant Examiner*—Paul J. Killos
*Attorney, Agent, or Firm*—Curtis, Morris & Safford

[57] ABSTRACT

Benzimidazoles of the formula

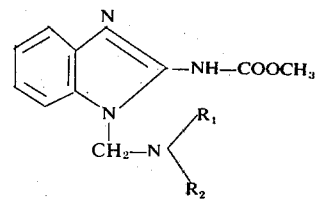

in which $R_1$ and $R_2$ are identical or different and are each alkyl, alkenyl, cycloalkyl, cycloalkylalkyl or alkylcycloalkyl, alkoxyalkyl and alkylthioalkyl, carboalkoxyalkyl, cyanoethyl, phenyl, benzyl or phenylethyl, $R_1$ in addition is alkoxy, and $R_1$ and $R_2$ together are alkylene optionally interrupted by O, S, >N—CH$_3$, >N—CH$_2$H$_5$ or substituted by methyl or ethyl groups or bridged by a methylene group, are especially valuable systemic fungicides.

11 Claims, No Drawings

NOVEL BENZIMIDAZOLES

The present invention relates to benzimidazoles of the formula I

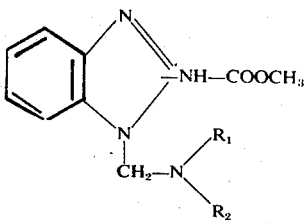

in which $R_1$ and $R_2$ are identical or different and are each alkyl having 1 to 18 carbon atoms, alkenyl having 3 to 18 carbon atoms, cycloalkyl having 4 to 8 carbon atoms, cycloalkylalkyl or alkylcycolalkyl having 5 to 6 carbon atoms in the ring and 1 to 3 carbon atoms in the alkyl or alkylene moiety, alkoxyalkyl and alkylthioalkyl having 2 to 12 carbon atoms altogether, carboalkoxyalkyl having 3 to 9 carbon atoms altogether, cyanoethyl, phenyl, benzyl or phenylethyl, $R_1$ in addition is alkoxy having 1 to 4 carbon atoms, and $R_1$ and $R_2$ together are alkylene having 4 to 7 carbon atoms optionally interrupted by O, S, $>N-CH_3$, $>N-C_2H_5$ or substituted by methyl or ethyl groups or bridged by a methylene group.

The compounds of formula I are prepared by reacting 2-methoxycarbonylamino-benzimidazole of the formula II

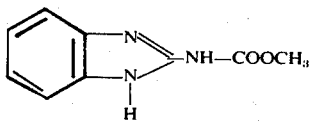

with a secondary amine of the formula III

and formaldehyde.

In preferred embodiment of the process of the invention the 2-methoxycarbonylamino-benzimidazole (II) is suspended or dissolved in a solvent, a one to two molar amount of the amine is added and, while stirring, a one to four molar amount of aqueous formaldehyde solution is added. Instead of aqueous formaldehyde solution, gaseous formaldehyde may also be used. The reaction is preferably carried out at temperatures of from 0° to 80°C, the temperature range being, however, not critical. Normally, the end products are dissolved in the reaction mixture and thus can be separated from unreacted 2-methoxycarbonylamino-benzimidazole by filtration. They are isolated in pure form by concentrating the remaining solution and treating it with an inert solvent, for example gasoline, or by recrysallization, for example from methylene chloride/gasoline.

Besides the amines used in the examples the following amines are suitable, cited by way of examples:

Diisopropylamine, di-sec.-butylamine, diphentylamine, dihexylamine, diheptylamine, dioctylamine, di-tert.-octylamine, dinonylamine, diisononylamine, didecylamine, diundecylamine, didodecylamine, di-tridecylamine, ditetradecylamine, dipentadecylamine, dihexadecylamine, diheptadecylamine, dioctadecylamine, N-propyl-N-propoxy-amine, N-butyl-N-butoxyamine, N-allyl-N-methylamine, N-allyl-N-ethylamine, N-allyl-N-propylamine, N-allyl-N-butylamine, N-benzyl-N-ethylamine, N-benzyl-N-propylamine, N-benzyl-n-butylamine, N-(2-cyanoethyl)-N-ethylamine, N-(2-cyanoethyl)-N-n-propylamine, N-(2-cyanoethyl)-N-isobutylamine, N-(2-cyanoethyl)-N-dodecylamine, N-(2-cyanoethyl)-N-isotridecylamine, N-(2-cyanoethyl)-N-hexadecylamine, N-(2-cyanoethyl)-N-octadecylamine, N-(2-carboethoxy-ethyl)-N-methylamine, N-(2-carbomethoxy-ethyl)-N-methylamine, N-(2-carbomethoxy-ethyl)-N-n-butylamine, n-propyl-isooctylamine, n-propyl-isononylamine, isobutyl-isononylamine, cyclohexyl-3-methyl-butylamine, cyclohexyl-isononylamine, di-isotridecylamine, N-methyl-N-cyclohexylamine, N-allyl-N-methylamine, N-oleyl-N-methylamine, N-oleyl-N-ethylamine, di-oleylamine, N-methoxyethyl-N-methylamine, di-(methoxyethyl)-amine, N-butoxyethyl-N-ethylamine, N-ethylthioethyl-N-methylamine, diphenylamine, di-(phenylethyl)-amine, di-(4-methyl-cyclohexyl)-amine, di-(4-isopropyl-cyclohexyl)-amine, di-(cyclohexylmethyl)-amine, N-ethyl-piperazine, heptamethyleneimine, 2,6-dimethyl-pyrimidine, 4-methylpyrimidine.

The solvents suitable for the reaction are preferably moderately or slightly polar solvents having a low boiling point, for example methylene chloride, chloroform, carbon tetrachloride, benzene; ethers such as diethyl ether, diisopropyl ether, and tetrahydrofurane; esters such as methyl acetate and ethyl acetate; or ketones such as acetone or methylethyl ketones; chloroform or methylene chloride being preferred.

2-Methoxycarbonylamine-benzimidazole can be prepared by the method described in J. Am. Chem. Soc. 56, page 144 (1934) by reacting o-phenylene diamine with S-methyl-isothiourea dicarboxylic acid-dimethyl ester. The preparation of the amines used for the reaction is likewise known from literature.

The compounds of the invention have a good fungicidal, especially systemic effect against plant fungi, which permits a curative control of fungi that have already penetrated into the plant tissue. This is especially important with fungus diseases having a long incubation time which cannot be combated with the conventional fungicides after infestation. The range of action of the novel compounds is very broad, they are effective against a number of important fungi causing diseases in crop forming, fruit growing, vine growing, hop growing, gardening, and the growing of ornamental plants. There are mentioned by way of example: Fusicladium, Glocosporium, Cylindrosporium, Botyrtis, Verticillium, Cercospora, Septoria, Mycosphaerella, Cladosporium, Colletotrichum, Rhizoctonia, Fusarium, Cercosporella, Ustilagineae, Erysiphaceae, Aspergillaceae, Sclerotinaceae.

Moreover, some of the novel compounds, especially those having long chain radicals R, have an excellent effect against phycomycetes which are unsusceptible to other known benzimidazole type fungicides such as Peronospora and Phytophthora. Their efficiency in this respect is equal and sometimes even superior to that of the known dithiocarbamates or the N-trichloromethyl-thiophthalimide derivatives which are presently used against these types of fungi.

The compounds of the invention can also be used for the protection of stored fruit and vegetables against infestation with fungi (for example Fusarium, Penicillinium and other types) and in the technical field, for example to protect textiles, wood, dyestuffs and paints for rot fungi and other fungal organisms.

The fungicides containing the aminoalkyl-benzimidazoles of formula I have a concentration of from 2 to 95 percent of active ingredient in admixture with the usual formulation additives such as solid or liquid inert carrier materials, adhesives, wetting and dispersion agents and/or grinding auxiliaries. They can be used in the form of wettable powders, emulsions, suspensions, dusts, or granules. The compositions may be mixed with other fungicides with which they form compatible mixtures.

Suitable carrier materials are mineral substances, for example, aluminium silicates, argillaceous earths, kaolin, chalk, siliceous chalk, talc, kieselguhr, and hydrated silicic acid, or preparations of thise material substances with special additives, for example chalk with sodium stearate.

Carrier materials for liquid preparations are all suitable and common organic solvents, for example toluene, xylene, diacetone alcohol, cyclohexanone, isophorene, gasoline, paraffin oils, dioxane, dimethyl formamide, dimethylsulfoxide, ethyl acetate, tetrahydrofurane, and chlorobenzene.

As adhesives there can be used glutinous cellulose products or polyvinyl alcohols.

As wetting agents there can be used all suitable emulsifiers, for example oxethylated alkylphenols, salts of aryl or alkylaryl sulfonic acids, salts of oleyl-methyltaurine, salts of oxethylated phenylsulfonic acids, and soaps.

Suitable dispersion media are celluloses waste liquor (salts of lignin sulfonic acid), salts of naphthalenesulfonic acid, and salts of oleyl-methyl-taurine.

As grinding auxiliaries, suitable inorganic or organic salts can be used, for example sodium sulfate, ammonium sulfate, sodium carbonate, sodium bicarbonate, sodium thiosulfate, sodium stearate, and sodium acetate.

The compounds of formula I can be used further as anthelmintic agents in veterinary medicine for combating parasitic diseases of warm blooded animals, especially helminths. They exhibit an especially pronounced anthelmintic activity, combined with a good compatibility against strongyles parasitic in the alimentary tract, mainly of ruminants. These parasites may cause great economical damage in animal breeding. Hence, the compounds of the invention represent valuable medicines. In practice, the anthelmintic agents are administered orally or subcutaneously. For oral administration ready-prepared suspensions (1 to 50 percent, preferably 3 to 15 percent strength), water suspendable powders (concentration 1 to 80 percent, preferably 40 to 70 percent), pastes or granules of different concentrations are used. For parenteral treatment sterile solutions of different concentrations are suitable. To achieve a good distribution, stabilization and conservation of the active ingredient, as well as an improved resorption, additives are necessary, preferably talc, lactose, magnesium stearate, finely dispersed silicic acid, starch and polyethylene glycol.

The following examples illustrate the invention.

A. Examples of Preparation

EXAMPLE 1

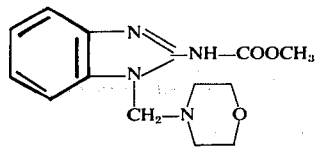

38.2 Grams (0.2 moles) of 2-methoxycarbonylamino-benzimidazole were suspended in 600 ml of methylene chloride, 17.4 g (0.2 mole) of morpholine were added and the mixture was heated to 35°C. At that temperature, 30 ml (0.33 mole) of aqueous formaldehyde solution of 35 percent strength were added dropwise, whereby the temperature rose to 38°C. Stirring was continued for an hour at 38°C, the mixture was allowed to cool while stirring, the unreacted 2-methoxycarbonylamino-benzimidazole was filtered off with suction, the filtrate dried over magnesium sulfate and concentrated at about 36°C under reduced pressure. The solid residue was dissolved and precipitated using methylene chloride/n-hexane.

12 Grams of 1-morpholinomethyl-2-methoxycarbonylamino-benzimidazole were obtained melting at 176°–177°C.

EXAMPLE 2

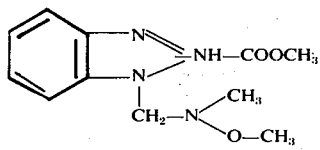

57.3 Grams (0.3 mole) of 2-methoxycarbonylamine-benazimidazole were suspended in 900 ml of methylene chloride, 18.3 g (0.3 mole) of N-methylmethoxyamine were added, the mixture was heated to 30°C and, while stirring, 43 ml (0.5 mole) of 35 percent aqueous formaldehyde solution were dropped in. Stirring was continued for 2 hours at 38°C, the mixture was allowed to cool while stirring, and the unreacted 2-methoxycarbonylamino-benzimidazole was filtered off with suction. The water was separated from the filtrate, the methylene chloride phase dried over magnesium sulfate, filtered and concentrated at 35°C under reduced pressure.

To eliminate adhering amine impurities the residue was stirred with 200 ml of gasoline (30/85°C). 19.84 Grams of 1-(N-methoxy-N-methylaminomethyl)-2-methoxycarbonylamino-benzimidazole melting at 202°C were obtained.

The compounds of the formula

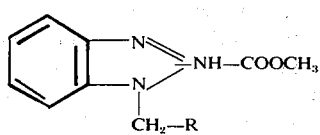

indicated in the following table were prepared in the manner described in Examples 1 and 2.

TABLE

| Example No. | R | Melting point °C |
|---|---|---|
| 3 | —N(CH₃)(CH₃) | 180–181 |
| 4 | —N(C₂H₅)(C₂H₅) | 190–194 |
| 5 | —N(C₃H₇)(C₃H₇) | 206–207 |
| 6 | —N(C₄H₉ n)(C₄H₉ n) | 203–205 |
| 7 | —N(C₄H₉ iso)(C₄H₉ iso) | 108–110 |
| 8 | —N(C₁₀H₂₁ iso)(C₁₀H₂₁ iso) | 145–163 |
| 9 | —N(CH₃)(C₃H₇) | 220 |
| 10 | —N(CH₃)(C₄H₉ n) | 210–211 |
| 11 | —N(CH₃)(C₁₂H₂₅) | 87–89 |
| 12 | —N(CH₃)(CH₂—C₆H₅) | 176–198 |
| 13 | —N(CH₂—C₆H₅)(CH₂—C₆H₅) | oil not distillable |
| 14 | —N(CH₂—CH=CH₂)(CH₂—CH=CH₂) | 196–199 |
| 15 | —N(CH₃)(CH₂—CH₂—CN) | 186–189 |
| 16 | —N(CH₂—CH=CH₂)(CH₂—CH₂—CN) | 170–175 |
| 17 | —N(CH(CH₃)(CH₃))(CH₂—CH₂—CN) | 124–125 |
| 18 | —N(C₄H₉ n)(CH₂—CH₂—CN) | 200–202 |
| 19 | —N(cyclohexyl-H)(CH₂—CH₂—CN) | 196–198 |
| 20 | —N(CH₂—CH₂—S—CH₃)(CH₂—CH₂—CN) | 180–182 |
| 21 | —N(C₄H₉ n)(CH₂—CH₂—COOC₂H₅) | 115–117 |
| 22 | —N(C₂H₅)(OC₂H₅) | 208–210 |
| 23 | —N(pyrrolidine) | 242–243 |
| 24 | —N(piperidine) | 198–200 |
| 25 | —N(hexamethyleneimine) | 188–190 |
| 26 | —N(N'-methylpiperazine)—CH₃ | 172–177 |
| 27 | —N(CH₃)(cyclohexyl-H) | 190–194 |
| 28 | —N(bicyclic) | 167–168 |

B. Examples of Application

EXAMPLE I

Winter wheat in the four-leaf stage was sprayed to the drip-off with the compounds according to Examples 3, 2, 9, 15, 11, 4, 22, 5, 6, 7 and 8, each in concentrations of 120, 60, 30, 15, 7.5, and 3.75 mg of active ingredient per liter of spray liquor. The experiment was repeated four times. As comparative compound benomyl (methyl-1-(butylcarbamoyl)-2-benzimidazole carbamate) was used in the same concentrations. After drying of the spray liquor the plants were strongly infested with conidia of wheat mildew (Erysiphe graminis) and placed in the greenhouse at 80–90 percent of relative atmospheric humidity and 20°–22°C.

After an incubation time of 14 days, the plants were examined by visual inspection as to the degree of infestation with mildew. The degree of infestation is expressed in % of infested leaf surface, compared with untreated and infested control plants.

The results summarized in Table I indicate that the compounds of the invention had a very good effect equal or even superior to that of benomyl.

EXAMPLE II

Kidney beans of the variety Andreas were thoroughly mixed for 10 minutes in a drum with the compounds of Examples 23, 24, 25, 1, and 26, the concentrations being 100, 50, 25, 12.5, 6.25 and 3.0 g of active ingredient for 100 kg of seeds. As comparative agent benomyl was used in the same concentration.

After a time of action of 24 hours, 10 beans each were sown in pots filled with earth strongly infested with Rhizoctonia solani causing rhizoctonia. The experiments were repeated 5 times. The pots were then placed in the greenhouse. 6 Weeks after sowing, the germinated plants were counted and the efficiency of the test compounds was determined in percent of healthy plants.

The results indicated in Table II show that the compounds of the invention had an excellent effect against Rhizoctonia solani equal or even superior to that of benomyl.

EXAMPLE III

Sugar beet plants in the six-leaf stage were strongly infested with conidia of Cercospora beticola causing leaf spot and placed in a climatic chamber having a relative atmospheric humidity of 100 percent and a temperature of 25°C. After an infestation time of 2 days the plants were transferred into the greenhouse where they were kept for 6 days at a temperature of 25°–26°C and a high relative atmospheric humidity of 80–90 percent.

The plants were then sprayed to the drip-off, with the compounds listed in Example I in a concentration of 120, 60, 30, 15, 7.5, and 3.75 mg of active ingredient per liter of spray liquor. Each experiment was carried out 4 times. As comparative agent benomyl was used in the same concentration.

After drying of the spray liquor, the plants were again brought into the greenhouse where they were kept until the development of the disease. The degree of infestation was evaluated by visual inspection. It is expressed in Table III in percent of infested leaf surface, calculated on the basis of untreated but infested control plants. It can be seen from the table that the compounds of the invention had a very good curative effect equal or even superior to that of the comparative agent.

EXAMPLE IV

Winter wheat of the variety Heine VII was thoroughly mixed for 10 minutes in a vibrating drum with the compounds listed in Example II, the concentration being 200, 100, 50, 25, 12.5 and 6.25 g of active ingredient for 100 kg of seeds. As comparative agent benomyl was used in the same concentration of active ingredient per 100 kg of seeds. After a time of action of 24 hours, the treated seeds were sown in pots filled with garden earth, 10 seeds in each pot in 5 repetitions, and the pots were placed in the greenhouse.

As soon as the germinated plants had developed the third or fourth leaf, they were strongly infested with conidia of mildew of wheat and the conditions in the greenhouse were adjusted to 80–90 percent of atmospheric moisture and 22°–23°C. After an incubation time of 14 days the plants were examined as to their infestation with mildew and the degree of infestation was determined in percent of infested leaf surface, calculated on the basis of untreated but infested control plants.

The results indicated in Table IV shows that the compounds of the invention had a good systemic effect and in general prevented the infestation with mildew better than the comparative agent.

EXAMPLE V

In a vibrating drum garden earth was thoroughly mixed for 10 minutes with the compounds listed in Example II and benomyl, respectively, the concentrations being 10, 5, 2.5, 1.25, 0.6, and 0.3 mg of active ingredient for each kg of earth. The treated earth was filled into pots and in 5 repetitions 10 seeds of wheat of the variety Heine VII were sown in each pot. Next, the pots were placed in the greenhouse.

After germination of the wheat, the plants were strongly infested in the 4-leaf stage with conidia of mildew of wheat (Erysiphe graminis) and the conditions in the greenhouse were adjusted to 80–90 percent of atmospheric moisture and 20°–22°C, i.e. optimum growing conditions for the fungus.

After an incubation time of 14 days, the plants were examined by visual inspection as to their infestation with mildew and the degree of infestation was determined in percent of infested leaf surface, calculated on the basis of untreated but infested control plants.

The result indicated in Example V shows that the compounds of the invention had a systemic effect which was generally better than that of the comparative agent.

EXAMPLE VI

The tips of apple seedlings of the variety Golden Delicious in the 6-leaf stage were pinched off, the lower older 2 leaves were removed and the plants were strongly infested with a suspension of conidia of Fusicladium dentriticum. The infested plants were kept dripping wet for 2 days in a climatic chamber having a relative humidity of 100 percent and a temperature of 20°C. Next, they were placed in the greenhouse at 18°C and a relative atmospheric humidity of 90–95 percent. After an infestation time of 5 days, the plants were treated with the compounds of Examples 23, 24, 25, and 1, respectively, the concentrations being 60, 30, 15, 7.5, 3.75, and 1.9 mg of active ingredient per liter of spray liquor. Each experiment was repeated 4 times. As comparative agent benomyl was used in the same concentrations.

After drying of the spray liquor, the plants were transferred again into the greenhouse where they remained until examination of the degree of infestation by visual inspection after a time of incubation of 3 weeks. The degree of infestation is expressed in percent of infested leaf surface, calculated on the untreated but infested control plants.

The results indicated in Table VI show that the compounds of the invention had a curvative effect superior to that of the comparative agent, which can be attributed to their good systemic properties.

EXAMPLE VII

Rice plants in the 4-leaf stage were treated with the compounds listed in Example I in concentrations of 60, 30, 15, 7.5, 3.75 and 1.9 mg of active ingredient per liter of spray liquor, each experiment being repeated 4 times. As comparative agent benomyl was used in the same concentrations. After drying of the spray liquor, the plants were strongly infested with Piricularia oryzae causing leaf spot and placed in a climatic chamber at 100 percent of relative humidity and 25°C.

After a residence time of 24 hours in the climatic chamber, the plants were transferred into the greenhouse having a temperature of 25°C to 26°C and a high relative humidity of 80–90 percent. After an incubation time of 14 days, the plants were examined by visual inspection as to their infestation with Piricularia. The degree of infestation is indicated in Table VII in percent of infested leaf surface in comparison to untreated but infested control plants.

The results show that the compounds of the invention had a very good fungicidal effect which was better than that of the comparative agent.

EXAMPLE VIII

Tomato plants of the variety Rheinlands Ruhm were strongly infested in the grown up 3-leaf stage with conidia of Cladosporum fulvum causing leaf mould and then placed in a climatic chamber at 25°C and 100 percent relative humidity. After 24 hours, the plants were transferred into the greenhouse having a relative humidity of 80–90 percent and a temperature of 25°–26°C.

After a time of infestation of 5 days, the plants were sprayed drip wet with the compounds listed in Example I, the concentrations being 60, 30, 15, 7.5, 3.75, and 1.9 mg of active ingredient per liter of spray liquor. As comparative agent benomyl was used in the same concentrations.

After drying of the spray liquor, the plants were replaced into the greenhouse and after an incubation time of 21 days, they were examined as to their infestation with leaf mould. The degree of infestation was determined by visual inspection and is given in Table VIII in percent of infested leaf surface in comparison to untreated but infested control plants.

The results show that the compounds of the invention had a good curative effect which was superior to that of the comparative agent.

EXAMPLE IX

Oat seeds of the variety Flamingsgold strongly infested artificially with Ustilago avenea causing loose smut of oats were treated for 10 minutes in a vibrating drum with the compounds listed in Example II and benomyl as comparative agent, respectively, the concentrations being 60, 30, 15, 7.5, 3.75 and 1.9 g of active ingredient for 100 kg of seeds.

After a time of action of 24 hours 10 seeds each were sown in pots filled with earth, in 5 repetitions, and the pots were placed in the greenhouse.

After shooting, the panicles infested with loose smut were counted. The results indicated in Table IX show that the compounds of the invention had an excellent effect against Ustilago avenea generally superior to that of benomyl.

EXAMPLE X

Grape vines grown from cuttings of the variety Silvaner were treated in the 4-leaf stage with the compounds listed in Examples 8 and 11, the concentrations being 500, 250, 125, 60, 30, and 15 mg of active ingredient per liter of spray liquor. Each experiment was repeated 4 times. As comparative agents benomyl (I) and folpet (II) were used in the same concentrations.

After drying of the spray liquor the plants were infested with a suspension of zoosporangia of Peronospora viticola and placed in a chamber at a relative humidity of 100 percent and a temperature of 20°C. After 24 hours the plants were transferred into the greenhouse at 25°C and 80–90 percent relative humidity.

After an incubation time of 7 days the wetted plants were placed over night into the moisture chamber to cause the disease to break out. The degree of infestation was determined by visual inspection, and is indicated in Table X in percent of infested leaf surface in comparison with untreated but infested control plants.

The results indicated in Table X show that the compounds of the invention had a very good effect against Peronospora which was equal to that of the comparative agent II (folpet), whereas comparative agent I (benomyl) was ineffective against the fungus.

EXAMPLE XI

Vines of the variety Silvaner grown from cuttings were treated in the 4-leaf stage with the compounds listed in Example X, the concentrations being 20, 10, 5, 2.5, 1.25, and 0.6 mg of active ingredient per liter of spray liquor. As comparative agents benomyl (I) and folpet (II) were used.

After drying of the spray liquor, the plants were strongly infested with conidia of powdery mildew of vine (Oidium tuckeri) and placed in the greenhouse having a temperature of 22°C and a relative humidity of 85–90 percent.

After an incubation time of 14 days, the plants were examined by visual inspection as to the degree of infestation with Oidium, given in percent of infested leaf surface in comparison to untreated but infested control plants.

The results indicated in Table XI show that the compounds of the invention had the same excellent effect as benomyl, in part they were even superior. In comparison folpet, which is well effective against Peronospora, even in high concentrations exhibited only a weak but absolutely insufficient effect against oidium.

EXAMPLE XII

Tomato plants of the variety Bonner Beste were treated, in the 3-leaf stage with the compounds listed in Example X, the concentrations being 500, 250, 125, 60, 30, and 15 mg of active ingredient per liter of spray liquor. Each experiment was repeated 4 times. As comparative agents benomyl (I) and zineb (II) were used in the same concentrations. After drying of the spray liquor, the plants were strongly infested with a suspension of zoosporangia of Phytophthora infestans and kept for one day in a climatic chamber at 100 percent of relative humidity and 15°C. Then they were transferred into a cold greenhouse at a temperature of 15°C and a relative humidity of 85–95 percent.

After an incubation time of 7 days, the plants were examined as to their infestation with Phytophthora, the degree of infestation being expressed in percent of infested leaf surface, calculated on the untreated but infested control plants. The results are indicated in Table XII.

TABLE I

| Compound of Example | % infestation with mildew of wheat with mg of active ingredient per liter of spray liquor | | | | | |
|---|---|---|---|---|---|---|
| | 120 | 60 | 30 | 15 | 7.5 | 3.75 |
| 3 | 0 | 0 | 2 | 8 | 17 | 25 |
| 2 | 0 | 0 | 5 | 10 | 21 | 28 |
| 9 | 0 | 0 | 5 | 12 | 20 | 27 |
| 15 | 0 | 0 | 2 | 7 | 15 | 23 |
| 11 | 0 | 0 | 5 | 10 | 16 | 25 |
| 4 | 0 | 6 | 12 | 21 | 30 | 40 |
| 22 | 0 | 5 | 10 | 18 | 27 | 36 |
| 5 | 0 | 0 | 5 | 12 | 18 | 28 |
| 6 | 0 | 3 | 10 | 16 | 25 | 31 |
| 7 | 0 | 5 | 8 | 15 | 26 | 34 |
| 8 | 0 | 10 | 15 | 25 | 30 | 42 |
| benomyl | 0 | 8 | 15 | 23 | 31 | 45 |
| *) | 100 | 100 | 100 | 100 | 100 | 100 |

*) untreated infested control plants

TABLE II

| Compound of Example | % efficiency against Rhizoctonia with g of active ingredient for 100 kg of seeds. | | | | | |
|---|---|---|---|---|---|---|
| | 100 | 50 | 25 | 12.5 | 6.25 | 3.0 |
| 23 | 100 | 100 | 95 | 80 | 70 | 65 |
| 24 | 100 | 100 | 100 | 90 | 85 | 70 |
| 25 | 100 | 100 | 90 | 85 | 75 | 70 |
| 1 | 100 | 100 | 100 | 95 | 85 | 80 |
| 26 | 100 | 100 | 95 | 90 | 80 | 70 |
| benomyl | 100 | 90 | 85 | 80 | 70 | 60 |
| untreated seeds in infested soil | 0 | 0 | 0 | 0 | 0 | 0 |

TABLE III

| Compound of Example | % infestation with Cercospora with mg of active ingredient per liter of spray liquor | | | | | |
|---|---|---|---|---|---|---|
| | 120 | 60 | 30 | 15 | 7.5 | 3.75 |
| 3 | 0 | 0 | 0 | 3 | 8 | 17 |
| 2 | 0 | 0 | 0 | 5 | 12 | 21 |
| 9 | 0 | 0 | 0 | 3 | 10 | 18 |
| 15 | 0 | 0 | 0 | 5 | 12 | 20 |
| 11 | 0 | 0 | 0 | 8 | 15 | 23 |
| 4 | 0 | 0 | 5 | 10 | 17 | 28 |
| 22 | 0 | 0 | 6 | 12 | 18 | 30 |
| 5 | 0 | 0 | 0 | 8 | 14 | 25 |
| 6 | 0 | 0 | 3 | 10 | 19 | 28 |
| 7 | 0 | 0 | 5 | 12 | 18 | 30 |
| 8 | 0 | 0 | 8 | 15 | 23 | 39 |
| benomyl | 0 | 0 | 10 | 17 | 25 | 38 |
| *) | 100 | 100 | 100 | 100 | 100 | 100 |

*) untreated infested control plants

TABLE IV

| Compound of Example | % infestation with mildew after seed treatment with g of active ingredient for 100 kg of seeds | | | | | |
|---|---|---|---|---|---|---|
| | 200 | 100 | 50 | 25 | 12.5 | 6.25 |
| 23 | 0 | 0 | 8 | 12 | 20 | 28 |
| 24 | 0 | 0 | 5 | 10 | 17 | 25 |
| 25 | 0 | 0 | 8 | 15 | 21 | 30 |
| 1 | 0 | 0 | 3 | 8 | 15 | 24 |
| 26 | 0 | 5 | 12 | 18 | 25 | 36 |
| benomyl | 0 | 10 | 15 | 21 | 34 | 45 |
| untreated infested control plants | 100 | 100 | 100 | 100 | 100 | 100 |

TABLE V

| Compound of Example | % infestation with mildew of wheat with mg of active ingredient per liter of spray liquor | | | | | |
|---|---|---|---|---|---|---|
| | 10 | 5 | 2.5 | 1.25 | 0.6 | 0.3 |
| 23 | 0 | 0 | 8 | 15 | 23 | 28 |
| 24 | 0 | 0 | 5 | 12 | 20 | 25 |
| 25 | 0 | 0 | 8 | 14 | 21 | 28 |
| 1 | 0 | 0 | 5 | 10 | 18 | 25 |
| 26 | 0 | 3 | 8 | 15 | 25 | 34 |
| benomyl | 0 | 5 | 10 | 18 | 27 | 39 |
| infested control plants in untreated earth | 100 | 100 | 100 | 100 | 100 | 100 |

TABLE VI

| Compound of Example | % infestation with Fusicladium with mg of active ingredient per liter of spray liquor | | | | | |
|---|---|---|---|---|---|---|
| | 60 | 30 | 15 | 7.5 | 3.75 | 1.9 |
| 23 | 0 | 0 | 5 | 10 | 15 | 28 |
| 24 | 0 | 0 | 3 | 10 | 18 | 23 |
| 25 | 0 | 0 | 3 | 8 | 15 | 25 |
| 1 | 0 | 0 | 0 | 3 | 8 | 19 |
| benomyl | 0 | 0 | 5 | 12 | 21 | 36 |
| untreated infested control plants | 100 | 100 | 100 | 100 | 100 | 100 |

TABLE VII

| Compound of Example | % infestation with Piricularia with mg of active ingredient per liter of spray liquor | | | | | |
|---|---|---|---|---|---|---|
| | 60 | 30 | 15 | 7.5 | 3.75 | 1.9 |
| 3 | 0 | 0 | 2 | 8 | 15 | 21 |
| 2 | 0 | 0 | 5 | 8 | 14 | 23 |
| 9 | 0 | 0 | 3 | 6 | 15 | 21 |
| 15 | 0 | 0 | 5 | 10 | 16 | 23 |
| 11 | 0 | 0 | 5 | 12 | 18 | 24 |
| 4 | 0 | 0 | 8 | 15 | 21 | 30 |
| 22 | 0 | 0 | 8 | 12 | 20 | 29 |
| 5 | 0 | 0 | 3 | 10 | 14 | 24 |
| 6 | 0 | 0 | 5 | 12 | 18 | 25 |
| 7 | 0 | 0 | 7 | 15 | 20 | 28 |
| 8 | 0 | 5 | 10 | 20 | 29 | 38 |
| benomyl | 0 | 3 | 10 | 21 | 30 | 42 |
| *) | 100 | 100 | 100 | 100 | 100 | 100 |

*) untreated infested control plants

TABLE VIII

| Compound of Example | % infestation with Cladosporium fulvum with mg of active ingredient per liter of spray liquor | | | | | |
|---|---|---|---|---|---|---|
| | 60 | 30 | 15 | 7.5 | 3.75 | 1.9 |
| 3 | 0 | 0 | 5 | 12 | 18 | 25 |
| 2 | 0 | 0 | 3 | 10 | 18 | 28 |
| 9 | 0 | 0 | 5 | 12 | 15 | 24 |
| 15 | 0 | 0 | 8 | 14 | 21 | 30 |
| 11 | 0 | 0 | 5 | 10 | 17 | 25 |
| 4 | 0 | 2 | 8 | 16 | 20 | 30 |
| 22 | 0 | 3 | 8 | 18 | 21 | 29 |
| 5 | 0 | 0 | 5 | 10 | 18 | 24 |
| 6 | 0 | 2 | 8 | 14 | 23 | 30 |
| 7 | 0 | 5 | 10 | 16 | 24 | 31 |
| 8 | 0 | 8 | 15 | 21 | 29 | 38 |
| benomyl | 3 | 10 | 18 | 25 | 31 | 45 |
| *) | 100 | 100 | 100 | 100 | 100 | 100 |

*) untreated infested control plants

TABLE IX

| Compound of Example | % of panicles infested with g of active ingredient per kg of seeds | | | | | |
|---|---|---|---|---|---|---|
| | 60 | 30 | 15 | 7.5 | 3.75 | 1.9 |
| 23 | 0 | 0 | 0 | 3 | 12 | 28 |
| 24 | 0 | 0 | 0 | 0 | 5 | 18 |
| 25 | 0 | 0 | 0 | 5 | 18 | 31 |
| 1 | 0 | 0 | 0 | 0 | 5 | 12 |
| 26 | 0 | 0 | 0 | 5 | 12 | 21 |
| benomyl | 0 | 0 | 3 | 10 | 18 | 35 |
| untreated infested oat seeds | 85 | 80 | 79 | 86 | 84 | — |

TABLE X

| Compound of Example | % of leaf infestation with peronospora with mg of active ingredient per liter of spray liquor | | | | | |
|---|---|---|---|---|---|---|
| | 500 | 250 | 125 | 60 | 30 | 15 |
| 8 | 0 | 0 | 8 | 15 | 21 | 30 |
| 11 | 0 | 0 | 0 | 5 | 10 | 20 |
| comparative agent I | 100 | 100 | 100 | 100 | 100 | 100 |
| comparative agent II | 0 | 0 | 5 | 12 | 18 | 30 |
| untreated infested control plants | 100 | 100 | 100 | 100 | 100 | 100 |

TABLE XI

| Compound of Example | % infestation with *Oidium* of vine with mg of active ingredient per liter of spray liquor | | | | | |
|---|---|---|---|---|---|---|
| | 20 | 10 | 5 | 2.5 | 1.25 | 0.6 |
| 8 | 0 | 8 | 16 | 23 | 32 | 39 |
| 11 | 0 | 3 | 10 | 18 | 26 | 35 |
| comparative agent I | 0 | 5 | 12 | 25 | 30 | 40 |
| comparative agent II | 80 | 95 | 100 | 100 | 100 | 100 |
| untreated infested control plants | 100 | 100 | 100 | 100 | 100 | 100 |

TABLE XII

| Compound of Example | % of infestation with *Phytophtora* with mg of active ingredient per liter of spray liquor | | | | | |
|---|---|---|---|---|---|---|
| | 500 | 250 | 125 | 60 | 30 | 15 |
| 8 | 0 | 2 | 10 | 18 | 30 | 42 |
| 11 | 0 | 0 | 6 | 18 | 25 | 36 |
| comparative agent I | 100 | 100 | 100 | 100 | 100 | 100 |
| comparative agent II | 0 | 0 | 8 | 15 | 28 | 40 |
| untreated infested control plants | 100 | 100 | 100 | 100 | 100 | 100 |

What is claimed is:

1. A benzimidazole of the formula I

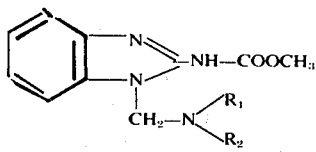   I in which R₁ and R₂ are identical or different and are each alkyl having 1 to 18 carbon atoms, alkenyl having 3 to 18 carbon atoms, cycloalkyl having 4 to 8 carbon atoms, cycloalkylalkyl or alkylcycloalkyl having 5 to 6 carbon atoms in the ring and 1 to 3 carbon atoms in the alkyl or alkylene moiety, alkoxyalkyl and alkylthioalkyl having 2 to 12 carbon atoms altogether, carboalkoxyalkyl having 3 to 9 carbon atoms altogether, cyanoethyl, phenyl, benzyl or phenylethyl, R₁ in addition is alkoxy having 1 to 4 carbon atoms, and R₁ and R₂ together are alkylene having 4 to 7 carbon atoms optionally interrupted by O, S, >N—CH₃, >N—C₂H₅ or substituted by methyl or ethyl groups or bridged by a methylene group.

2. A compound as claimed in claim 1 which is

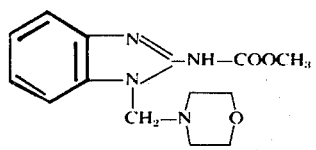

3. A compound as claimed in claim 1 which is

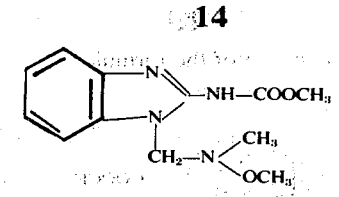

4. A compound as claimed in claim 1 which is

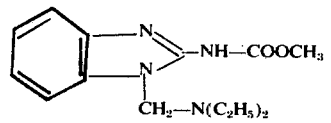

5. A compound as claimed in claim 1 which is

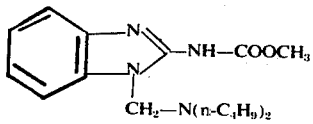

6. A compound as claimed in claim 1 which is

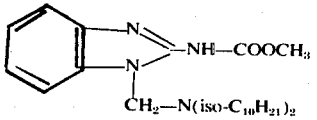

7. A compound as claimed in claim 1 which is

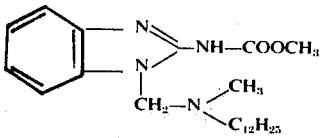

8. A compound as claimed in claim 1 which is

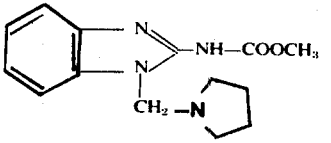

9. A compound as claimed in claim 1 which is

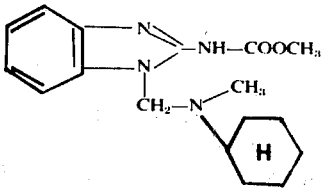

10. A compound as claimed in claim 1 which is

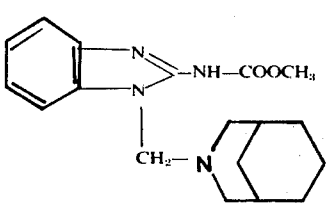

11. A benzimidazole of the formula

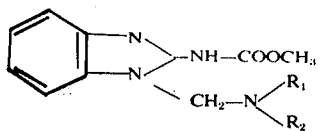

in which $R_1$ is alkoxy of 1 to 4 carbon atoms or $R_1$ and $R_2$ are identical or different and are alkyl of 1 to 18 carbon atoms, alkenyl of 3 to 18 carbon atoms, cycloalkyl of 4 to 8 carbon atoms, cycloalkylalkyl or alkylcycloalkyl of 5 to 6 carbon atoms in the ring and 1 to 3 carbon atoms in the alkyl or alkylene moiety, alkoxyalkyl or alkylthioalkyl of 2 to 12 carbon atoms.

* * * * *